United States Patent [19]

Shields et al.

[11] 3,942,823
[45] Mar. 9, 1976

[54] TOWING TRACTOR CONSTRUCTION

[76] Inventors: Morton K. Shields, 18632 Gault St., Reseda, Calif. 91335; Russell K. Shields, 12107 Maddox Lane, Bowie, Md. 20715

[22] Filed: May 15, 1974

[21] Appl. No.: 470,126

[52] U.S. Cl. .............. 280/423 R; 180/11; 180/19 R
[51] Int. Cl.² ........................................ B62D 53/00
[58] Field of Search ............ 280/423 R, 415, 476 R, 280/150.5, 3, 438; 180/11 R, 19 R

[56] References Cited
UNITED STATES PATENTS

| | | | |
|---|---|---|---|
| 2,498,779 | 2/1950 | Winchester | 280/476 X |
| 3,166,141 | 1/1965 | Shields et al. | 280/423 R X |
| 3,179,196 | 4/1965 | Richardson | 280/477 X |
| 3,439,764 | 4/1969 | Kimball | 280/3 X |
| 3,843,161 | 10/1974 | Hastings | 280/423 R |

*Primary Examiner*—Kenneth H. Betts
*Assistant Examiner*—R. Schrecengost
*Attorney, Agent, or Firm*—Robert E. Geauque

[57] ABSTRACT

In combination with a tractor for towing a vehicle wherein the tractor includes a chassis upon which is secured a driving wheel assembly, the tractor including a motor for rotating the driving wheel assembly, an attachment for connecting the tractor to the vehicle, the attachment usable in two different modes to connect to the vehicle, the first mode using a horizontal connecting member pivotally mounted upon the chassis, so that the pivot axis intersects the tractor's drive wheel axis and is located midway between the driving wheels, the horizontal connecting member to cooperate in a telescoping manner within a tubular member secured to the vehicle, a pin insertable within aligned apertures between the connecting member and the tubular member to lock such together, the second mode employing a ball mounted upon the connecting member which is to cooperate with a conventional ball socket attached to the vehicle, a clamp bar employed to lock the connecting member to the tubular member.

9 Claims, 8 Drawing Figures

TOWING TRACTOR CONSTRUCTION

BACKGROUND OF THE INVENTION

The field of this invention relates to the construction of a tractor for the towing of wheeled land vehicles such as house trailers, boat trailers, or any kind of trailer. Also, the apparatus of this invention is useful for moving airplanes into and out of a hangar.

The apparatus of this invention is considered to be an improvement of the tractor apparatus which is shown and described in U.S. Pat. No. 3,166,141, patented Jan. 19, 1965.

The tractor construction of the above-mentioned patent includes a pair of stabilizing arms and trailing caster wheels which are considered to be required in order to prevent the motorized dolly from overturning backwards when pulling a trailer forwards. The stabilizing arms and their associated trailing caster wheels are mounted aft of the driving wheels of the tractor or between the driving wheels of the tractor and the vehicle being moved. The use of the stabilizing arm and trailing caster wheels are a costly addition to the tractor structure. Although costly, it was just accepted that such are necessary in order to resist the overturning moment. With the use of such stabilizing arms and trailing caster wheels, the connecting and disconnecting of the tractor to the vehicle to be moved is accomplished quite quickly and with relative simplicity. However, on some trailers with roll prevention devices, said trailing caster wheels get in the way.

SUMMARY OF THE INVENTION

The tractor apparatus of this invention relates to the elimination of the stabilizing trailing caster wheels which are normally employed within such tractor structure shown in previously mentioned U.S. Pat. No. 3,166,141. The apparatus of this invention is to provide for quick attachment to a non-motorized vehicle such as a trailer and effect movement of such from one locale to another locale within a confined area such as a trailer sales lot. The tractor is basically conventional and includes a motor which is to operate a pair of spaced apart driving wheels, the axle of each wheel being in alignment with each other. A connecting means is mounted upon the tractor and is designed to facilitate easy and quick attachment of the tractor to the attaching tongue of the vehicle.

The connecting means is to take either one or two embodiments. If the attaching tongue includes a tubular member, the connecting means is to comprise an elongated member which is to be telescopingly received within the tubular attaching tongue. A pin is to be interconnected between the tongue and the elongated member. The elongated member is fixedly attached to a vertical stanchion which is turn is pivotally mounted upon the aft end of the tractor. The pivot axis intersects the drive wheel axis whereby the drive wheels of the tractor and the wheels of the vehicle to be towed result together in the formation of a four wheel front wheel drive unit.

The second embodiment of connecting means of this invention employs a conventional ball secured to the elongated member. The ball is positioned at any convenient location along the elongated member. It is to be understood that the forward direction is toward the front end of the tractor with the aft direction being toward the vehicle being towed.

The elongated member in each embodiment is connected by spring means with respect to the chassis, the spring means functioning to align the elongated member to a particular horizontal position when the tractor is not in use, the particular horizontal position being so that the longitudinal axis of the elongated member is substantially in line with the longitudinal axis of the tractor. A clamp bar is employed to securely bind the elongated member to the attaching tongue in the second embodiment of this invention. If desirable, in order to prevent the elongated member from scratching the painted surface of the tongue of the vehicle, the elongated member may include a layer of material thereon which will not permit the forming of scratches on the tongue.

DETAILED DESCRIPTION OF THE SHOWN EMBODIMENTS

Figure 1:
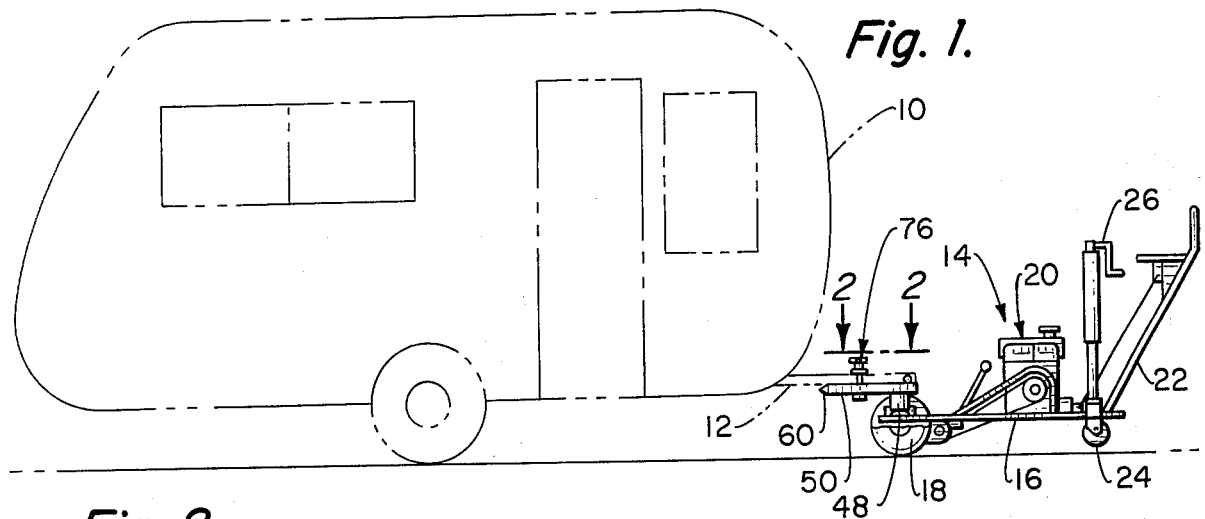
FIG. 1 is a view of the apparatus of this invention showing how such is connected with a land vehicle such as a trailer.

Referring particularly to the drawings, there is shown in FIG. 1 a wheeled land vehicle 10 such as a house trailer or the like. Connected to the land vehicle 10 is an attaching tongue 12 which has formed therein a ball socket (not shown).

A self-propelled tractor 14 is shown in FIG. 1 and is to be employed to connect with the land vehicle 10 to move such from one locale to another. It is to be understood that the movements by the tractor 14 are to be limited and not constitute a long distance. Normally, the movements will be in a given area such as a parking area. The tractor 14 basically takes the form of the tractor construction shown in U.S. Pat. No. 3,166,141, patented Jan. 19, 1965 entitled TRACTOR. This tractor 14 is shown in both FIGS. 1 and 6 with FIG. 1 being directed to the first embodiment of this invention, and FIG. 6 being directed to the second embodiment of this invention.

Figure 6:
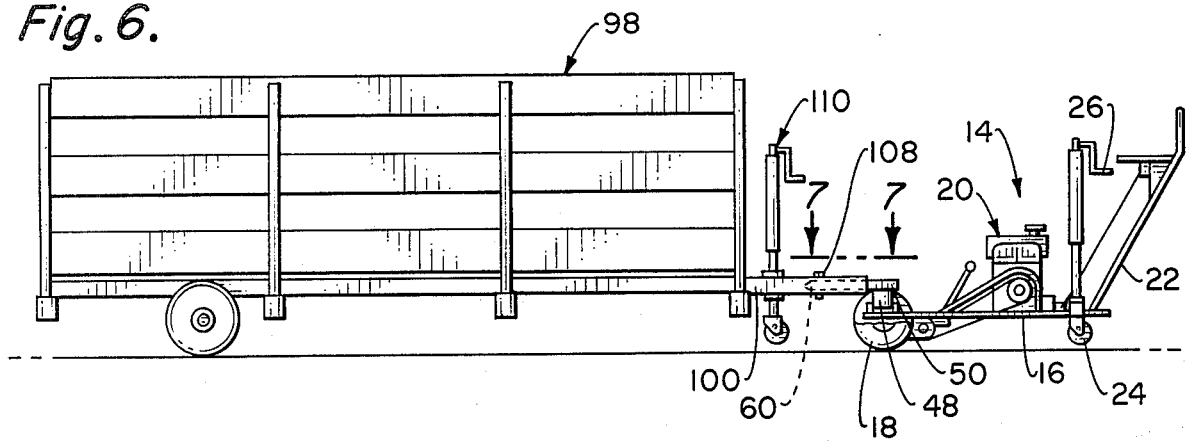
FIG. 6 is a view similar to FIG. 1 but showing the second embodiment of this invention.

By comparing the drawing of the tractor within FIGS. 1 and 6 of this invention with the tractor of the aforementioned patent, it is to be noted that the tractor in this invention has no trailing wheels which are employed within the aforesaid patent. These trailing wheels are to prevent the tractor from overturning during use. The improved structre of this invention relates to devices which are to be substituted for the costly trailing caster wheel construction and still prevent the tractor from overturning during use. This structure is as follows.

The tractor 14 includes a chassis 16. Connected to the chassis 16 is mounted a pair of spaced apart driving wheels 18, only one being shown in FIGS. 1 and 6. The axles of the driving wheels are in alignment establishing a single driving wheel axis. The driving wheels 18 are rotatably driven by means of a motor or power means 20. The motor 20 is fixedly mounted upon the chassis 16. A guiding or steering handle 22 is connected to the chassis 16. A front supporting caster wheel 24 is connected to the chassis 16 at the front portion of the tractor 14. Wheel 24 is of such a diameter that it will be several inches above the ground when the tractor 14 is connected with the vehicle 10, in other words, when the chassis 16 is in a horizontal position. The caster wheel 24 is employed to move the unattached tractor 14 and locate such to connect with the vehicle 10. Once the tractor 14 has connected with the tongue 12 of the vehicle, the caster wheel 24 is cranked by crank 26 to an upper position shown in FIGS. 1 and 6.

Referring to the first embodiment of this invention shown in FIGS. 1 to 5, an attaching bracket 28 is fixedly attached to the chassis 16 by bolts 30. The bracket 28 is located directly above the drive wheel axis. The bracket 28 is basically U-shaped and includes an aperture in each of the legs of the U-shaped bracket and the apertures are aligned with respect to one another. An inner cylindrical sleeve 32 includes a pair of aligned apertures 34 and 36 which are to align with the apertures 38 and 40 of the attaching bracket 28. With the apertures 34 and 36 being aligned with apertures 38 and 40, a pin 41 is locatable therethrough and secured at either end by cotter keys 44 and 46.

Surrounding the inner sleeve 32 in a telescopingly close fitting manner is an outer sleeve 48. Outer sleeve 48 is integrally formed as a part of elongated member 50. An aperture is formed through the inner sleeve 32 through the outer sleeve 48 and through the wall of the elongated member 50. A bolt and nut assembly 52 is conducted therethrough to prevent disassociation of the outer sleeve 48 from the inner sleeve 32. However, the nut assembly 52 is not tightened to such a point as to prevent rotational movement between the outer sleeve 48 and the inner sleeve 32. It is to be understood that the elongated member 50 is formed of a basically polygonal cross-sectional configuration and is hollow forming an interior chamber 54. Although a polygonal configuration for the elongated member 50 is preferred, it is considered to be within the scope of this invention to employ a cylindrical member 50, or a polygonal configuration other than the square configuration shown in the drawings.

Formed within the upper surface of the elongated member 50 are a pair of spaced apart apertures 56 and 58. Aperture 58 is located adjacent the forward end of the elongated member 50 with aperture 56 located adjacent the aft end of the elongated member 50. The very aft end of the elongated member 50 is formed into a point 60. Formed within the bottom surface of the elongated member 50 are a series of apertures 62, therebeing five in number of such apertures 62 or any other number. Also formed through the lower surface of the elongated member 50 is an aperture 64 which is of the same size and in alignment with the aperture 56.

When the apparatus of this invention is at rest, it is desirable, in order to facilitate initial connecting of the apparatus of this invention with the tongue 12, that the elongated member 50 be level or horizontal and also that the longitudinal axis of the elongated member 50 be in substantial alignment with the longitudinal axis of the tractor 14. The elongated member 50 is capable of movement about a horizontal axis established by the pin 42 and also movement about a vertical axis established by nut assembly 52. In order to accomplish this desired initial alignment, springs 66 and 68 are employed. Spring 66 is connected between the chassis 16 and one side of the outer sleeve 48 with the other spring 68 being connected between the chassis 16 and the other side of the sleeve 48. The springs 66 and 68 are under initial tension and exert counter torque about the inner sleeve 32 which causes the longitudinal axis of the elongated member 50 to be in substantial alignment with the longitudinal axis of the tractor 14. Also, the springs 66 and 68 exert opposite opposing torques about the pin 41 which results in the horizontal member being located in the substantially horizontal or level position shown in the drawings.

Figure 2:
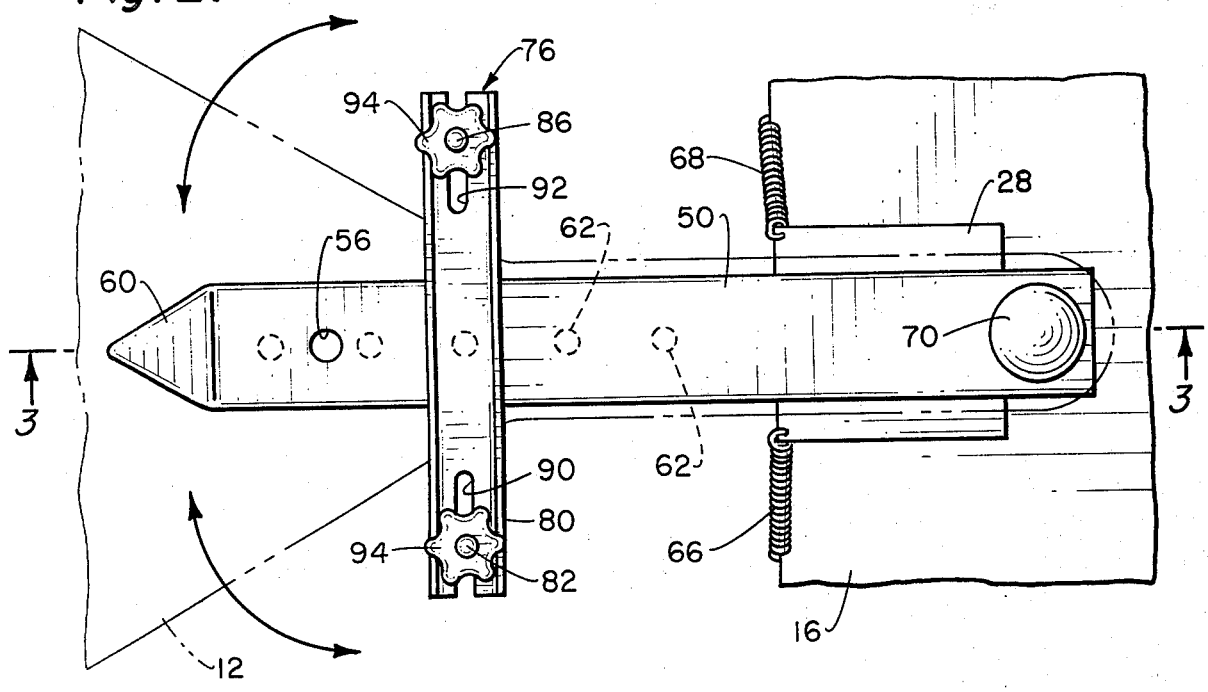
FIG. 2 is a plan view of a portion of the apparatus of this invention taken along line 2—2 of FIG. 1.
Figure 4:
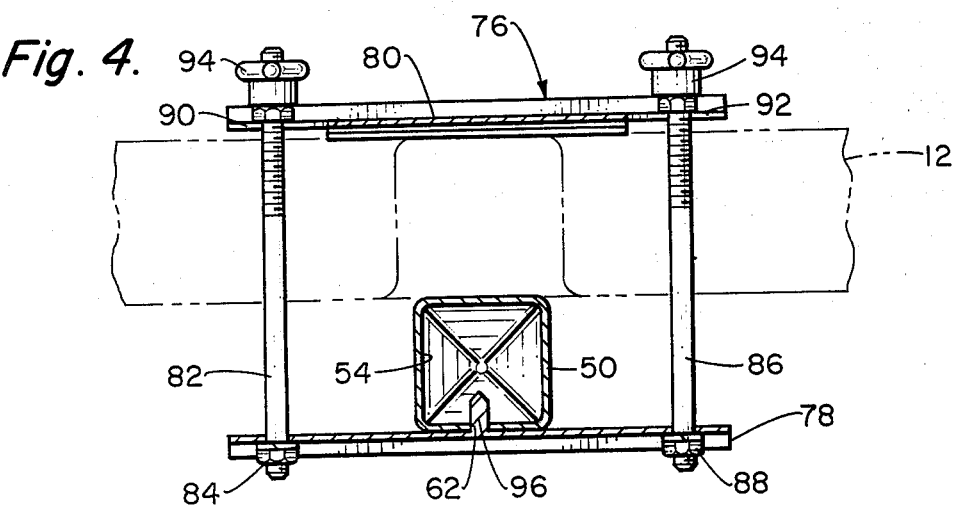
FIG. 4 is a cross-sectional view through the first embodiment of this invention taken along line 4—4 of FIG. 3.
Figure 3:
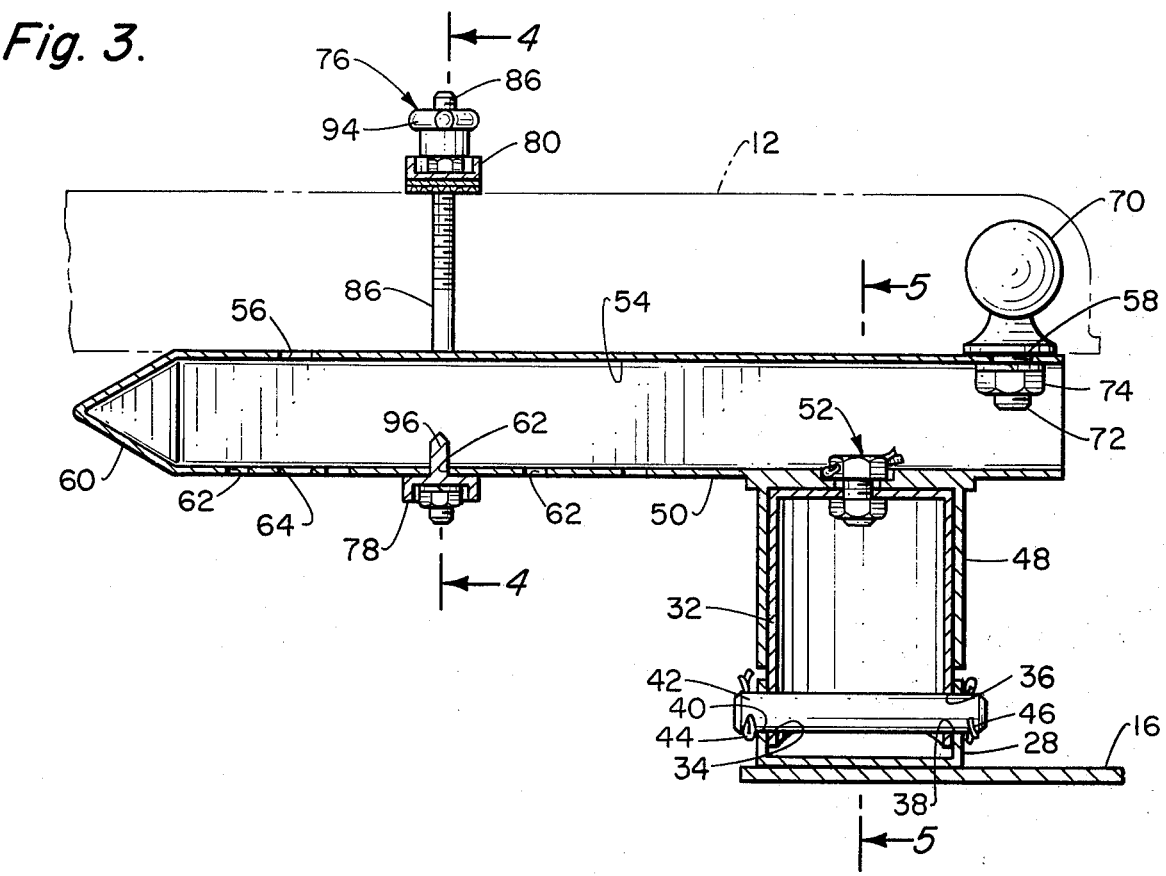
FIG. 3 is a cross-sectional view of the first embodiment of this invention taken along line 3—3 of FIG. 2.
Figure 5:
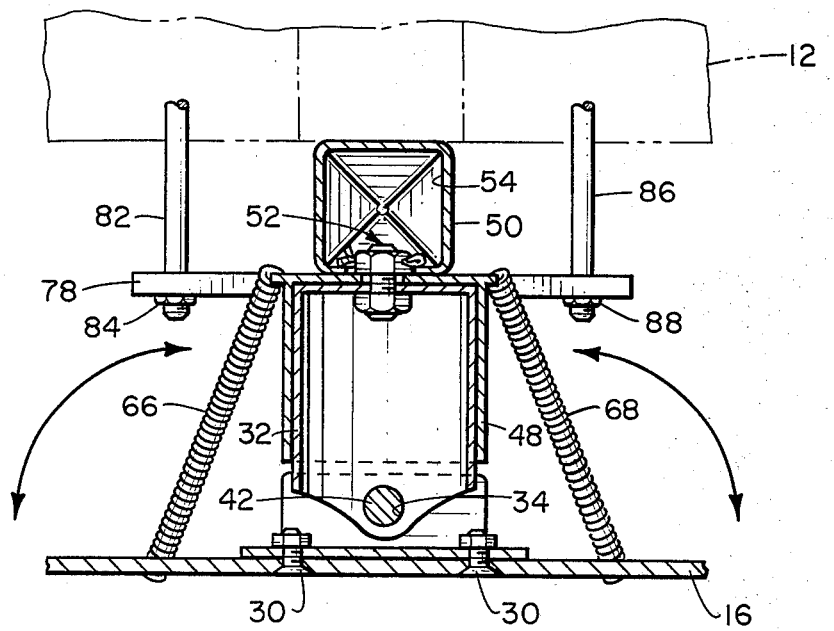
FIG. 5 is a cross-sectional view showing in more detail the first embodiment of this invention taken along line 5—5 of FIG. 3.

All of the foregoing description of this invention is included in both the first embodiment and the second embodiment. The first embodiment of this invention is to employ the use of a conventional hitch ball 70. The ball is shown in FIGS. 2 and 3 of the drawings. The ball 70 is secured to the elongated member 50 by means of bolt 72 and nut 74. The bolt 72 passes through the aperture 58. Upon positioning the tongue 12 upon the ball 70, the weight of the vehicle which is imparted through the tongue 12, is essentially balanced upon the tractor 14.

The upper surface of the elongated member 50 is positioned against the under surface of the tongue 12 when the tongue 12 is in contact with the ball 70. It is desired that the elongated member 50 be secured to the tongue 12 during use of the tractor 14. For this purpose, a clamp bar assembly 76 is employed. The clamp bar assembly 76 comprises a lower clamp bar 78 and an upper clamp bar 80. Both the clamp bars 78 and 80 are of a channel shape configuration and are positioned so that the sides of each of the channels are located outwardly away from each other. A threaded rod 82 has attached thereto a nut 84 at its lowermost end. In a similar manner, a threaded rod 86 has attached thereto a nut 88 at its lowermost end. The threaded rods 82 and 86 are to respectively cooperate with slots 90 and 92 which are formed in opposite ends of the upper clamp bar 80. Enlarged manually turnable nuts 94 are connected to each of the threaded rods 82 and 86 with the threaded rods 82 and 86 cooperating within their respective slots 90 and 92. By the rotating of the nuts 94, the upper clamp bar 80 is forced against the upper surface of the tongue 12 with the lower clamp bar 78 being forced against the elongated member 50 which in turn is forced against the lower surface of the tongue 12. Therefore, any force moment which is created with respect to the tractor 14 tending to dislodge the ball 70 from the tongue 12, is counteracted by a secure connection being established between the tongue 12 and the elongated member 50.

Formed upon the upper surface of the lower clamp bar 78 and positioned at the midpoint of the longitudinal length of the bar 78 is a upstanding projection 96. The projection 96 is to cooperate with one of the apertures 62. Therefore, the clamp bar assembly 76 is correctly positioned with respect to the elongated member 50.

Figure 7:
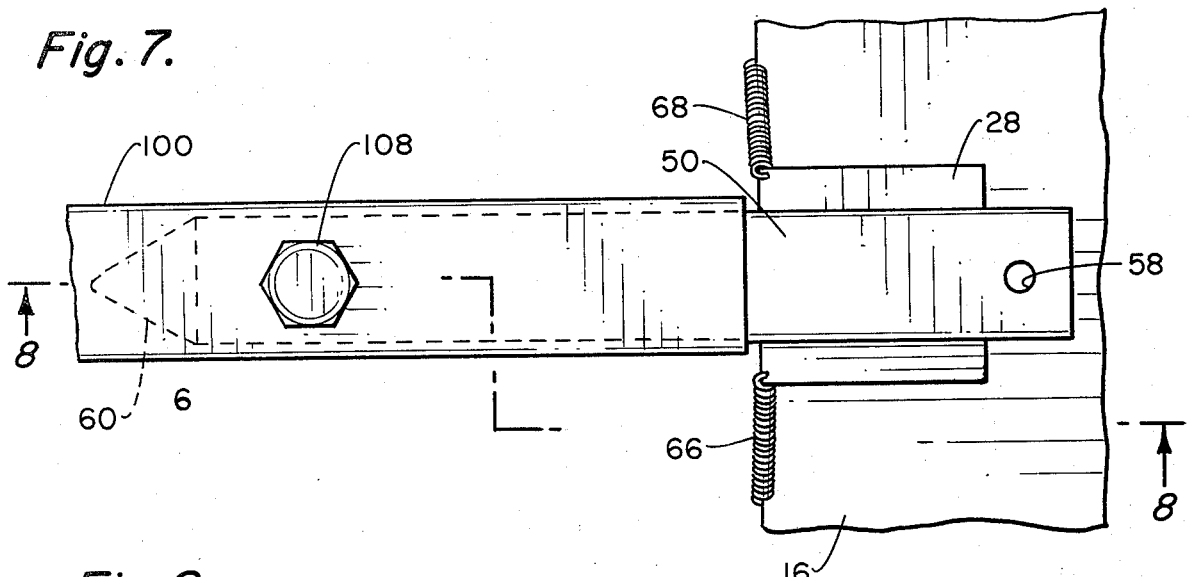
FIG. 7 is a plan view of a portion of the second embodiment of this invention taken along line 7—7 of FIG. 6.
Figure 8:
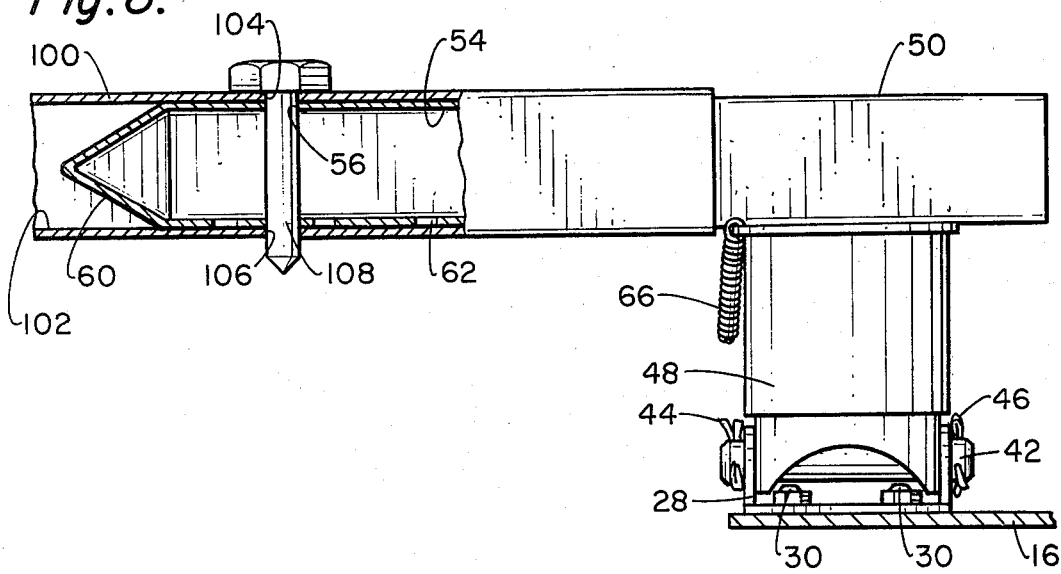
FIG. 8 is a partial cross-sectional view of the second embodiment of this invention taken along line 8—8 of FIG. 7.

Referring particularly to the second embodiment of this invention, as shown in FIGS. 6 to 8, it is contemplated that a trailer 98 may employ a tongue 100 which does not include a ball socket, but only includes an interior hollow elongated opening 102. The opening 102 is basically of the same configuration as the elongated member 50 and is adapted to telescopingly extend within the chamber 102. The tongue 100 is to include a pair of aligned openings 104 and 106 which are adapted to receive a latching pin 108. The latching pin 108 prevents disassociation of the elongated member 50 with respect to the tongue 100. By the use of the telescoping arrangement between the tongue 100 and elongated member 50, and the latching pin 108, a secure interconnection between the tongue 100 and elongated member 50 is achieved by the latching pin 108 which is the full equivalent of the ball 70 and the clamp bar assembly 76 of the first embodiment.

The operation of the apparatus of this invention is as follows: The operation of both embodiments is essentially identical. It will be assumed that the land vehicle 10 or 98 is sitting stationary in a particular locale and the tractor 14 is not attached to the vehicle. The operator decides to move the land vehicle to another locale. The operator then proceeds to activate the tractor 14 by starting of the motor 20 and moving the tractor 14 by means of the drive wheels 18 and the caster wheel 24. The tractor is positioned so as to connect with the vehicle as shown in either FIG. 1 or FIG. 6. After the tractor is connected to the vehicle, the caster wheel 24 is raised by means of rotating of crank 26, leaving only the drive wheels 18 in contact with the ground. Within the first embodiment of FIG. 1, the clamp bar assembly 76 is then installed, with the upper clamp bar 80 being positioned upon the upper surface of the tongue 12 and with the lower clamp bar 78 being positioned on the lower surface of the elongated member 50. The enlarged nuts 94 are then tightened which results in the tight connection being established between the tongue 12 and the elongated member 50. Within the second embodiment of this invention, once the elongated member is positioned with the end of the tubular member 100, it is only necessary to effect alignment of the holes 56, 104 and 106 in order to receive the latching pin 108. Once the latching pin 108 is inserted, the vehicle 98 is ready to be moved.

When using the second embodiment of this invention shown in FIGS. 6 to 9, it would be desirable to have a jack ending with a caster on both the vehicle tongue and the tractor. Such a jack is shown by caster 24 and crank 26 mounted upon the tractor and a similar jack assembly 110 is shown connected to the tongue 100 of the vehicle 98. By appropriate cranking of these jack assemblies, appropriate vertical alignment of the vehicle tongue 100 and the elongated member 50 is accomplished so that the elongated member is aligned to be telescopingly received within the tongue 100. Once the elongated member is inserted within the tongue 100, the pin 108 is inserted, thus locking the two units together. Both jack assemblies would then be raised thus creating, in combination with the wheels of the vehicle, a four-wheel, front wheel, drive unit.

As the vehicle is guided to its desired position, the tractor will quite frequently be moved over uneven ground. Uneven ground produces moments turning the chassis 16 to the tractor 14 about a horizontal axis and/or vertical axis in respect to the tongue of the vehicle. The tongue will remain in the plane established by the wheels of the land vehicle. It is desired to keep the driving wheels 18 of the tractor 14 in continuous contact with the ground. The moments caused by the uneven ground tend to produce a turning of the chassis 16 with respect to the elongated member 50. By the mounting of the chassis 16 about the horizontal axis by means of pin 42, the main portion of the tractor 14 can pivot to keep the driving wheels 18 in continuous contact with the ground.

The tractor 14 of this invention can make turns in either direction up to ninety degrees. This turning of the tractor 14 is permitted due to the loose interconnection established between the outer sleeve 48 and the inner sleeve 32.

After the vehicle has been moved to its desired position, within the first embodiment, the enlarged nuts 94 are loosened and the upper clamp bar 80 is removed which thereupon permits disassociation of the ball 70 from the socket (not shown) located within the tongue 12 and complete disassociation of the tractor 14 from the vehicle 10. Within the second embodiment, after the vehicle has been moved to its desired position, the latching pin 108 is removed and the tractor moved out of disassociation of the vehicle 98. The tractor 14 is then ready for use to move another land vehicle if desired.

Where a single trailer is being used to haul feed in an animal feed lot, material in a factory, or similar application, the tractor apparatus of this invention could be permanently attached to a trailer tongue. If the feed lot or factory covered a large area, a seat could be mounted upon the apparatus of this invention and a means provided for steering the tractor.

It is to be understood that the tractor 14 of this invention will include a differential located between the driving wheels 18. This differential would supply the conventional function of a differential wherein each driving wheel 18 could be operated at different speeds.

What is claimed is:

1. In combination with a tractor for towing a vehicle, said tractor having a chassis, the longitudinal dimension of said chassis having a forward end and an aft end, a pair of spaced apart driving wheels mounted upon said aft end of said chassis, said driving wheels having a common axis of rotation, power means for rotating said driving wheels, a connecting means mounted on said tractor for connecting the tractor to the vehicle, said connecting means comprises:

an elongated member mounted by pivot means upon said chassis, said pivot means including structure movably supporting said elongated member relative to said chassis about a horizontal axis and a vertical axis, said vertical axis intersecting said common axis of rotation midway between said driving wheels, said horizontal axis intersecting said vertical axis, said horizontal axis being parallel to said longitudinal dimension.

2. The combination as defined in claim 1 wherein: said elongated member having a forward end and an aft end, said pivot means connected to said forward end of said elongated member, said aft end of said elongated member extending a substantial distance rearwardly of said aft end of said chassis.

3. The combination as defined in claim 2 wherein: a first aperture formed in said elongated member adjacent said forward end, said first aperture being adapted to connect with a hitch ball assembly, said hitch ball assembly receivable in a socket formed in an attaching tongue attached to said vehicle.

4. The combination as defined in claim 3 wherein:
said elongated member fixedly connected by a clamp bar assembly to said tongue, said clamp bar assembly comprises a pair of spaced apart threaded rods, said tongue positionable between said threaded rods and between upper and lower clamp bars of said clamp bar assembly, both said clamp bars connected to both said threaded rods, nut means associated with each said threaded rod, upon said nut means being tightened upon said rods said tongue is clamped between said clamp bars.

5. The combination as defined in claim 1 wherein:
a second aperture in said elongated member adjacent said aft end of said elongated member, said elongated member to be telescopingly received within an attaching tongue of said vehicle, a latching pin to be conducted through said attaching tongue and said second aperture to securely lock together said tongue and said elongated member.

6. The combination as defined in claim 5 wherein:
said aft end of said elongated member being formed into a point, whereby said point functions as a guide during the insertion movement of said elongated member within said attaching tongue to align said elongated member correctly within said attaching tongue.

7. The combination as defined in claim 6 wherein:
spring means interconnecting said elongated member and said chassis, said spring means functioning to tend to maintain said elongated member in horizontal position when said tractor is not in use.

8. In combination with a tractor for towing a vehicle, said tractor having a chassis, said chassis having a forward end and an aft end, a pair of spaced apart driving wheels mounted upon said aft end of said chassis, said driving wheels having a common axis of rotation, power means for rotating said driving wheels, a connecting means for connecting the tractor to the vehicle, said connecting means comprises:

an elongated member mounted by pivot means upon said chassis, said pivot means including structure movably supporting said elongated member relative to said chassis about a horizontal axis and a vertical axis, said vertical axis intersecting said common axis of rotation midway between said driving wheels, said horizontal axis intersecting said vertical axis;

said elongated member having a forward end and an aft end, said pivot means connected to said forward end of said elongated member, said aft end of said elongated member extending a substantial distance rearwardly of said aft end of said chassis;

a first aperture formed in said elongated member adjacent said forward end, said first aperture being adapted to connect with a hitch ball assembly, said hitch ball assembly receivable in a socket formed in an attaching tongue attached to said vehicle;

said elongated member fixedly connected by a clamp bar assembly to said tongue, said clamp bar assembly comprises a pair of spaced apart threaded rods, said tongue positionable between said threaded rods and between upper and lower clamp bars of said clamp bar assembly, both said clamp bars connected to both said threaded rods, nut means associated with each said threaded rod, upon said nut means being tightened upon said rods said tongue is clamped between said clamp bars; and said lower clamp bar including a projection, at least one aperture formed in the lower surface of said elongated member, said projection to cooperate within said aperture to establish the correct position of said clamp bar assembly upon said elongated member.

9. The combination as defined in claim 8 wherein:
spring means interconnecting said elongated member and said chassis, said spring means functioning to tend to maintain said elongated member in a horizontal position when said tractor is not in use.

* * * * *